(12) United States Patent
Neuse et al.

(10) Patent No.: US 12,488,339 B1
(45) Date of Patent: *Dec. 2, 2025

(54) AUDITABLE SYSTEM FOR EVENT TRACKING

(71) Applicant: United Services Automobile Association (USAA), San Antonio, TX (US)

(72) Inventors: Jonathan Edward Neuse, Helotes, TX (US); Sumita T. Jonak, San Antonio, TX (US); Lindsay Young, Lucas, TX (US); Nathan Fillinger, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 6 days.

This patent is subject to a terminal disclaimer.

(21) Appl. No.: 18/764,139

(22) Filed: Jul. 3, 2024

Related U.S. Application Data

(63) Continuation of application No. 17/941,944, filed on Sep. 9, 2022, now Pat. No. 12,056,693, which is a
(Continued)

(51) Int. Cl.
*G06Q 20/38* (2012.01)
*G06Q 10/0633* (2023.01)
(Continued)

(52) U.S. Cl.
CPC ..... *G06Q 20/3829* (2013.01); *G06Q 10/0633* (2013.01); *H04L 9/30* (2013.01); *H04L 63/0428* (2013.01)

(58) Field of Classification Search
CPC .. G06Q 20/3829; G06Q 10/0633; H04L 9/30; H04L 63/0428
(Continued)

(56) References Cited

U.S. PATENT DOCUMENTS

| 8,571,990 B2 | 10/2013 | Buss |
| 10,255,419 B1 | 4/2019 | Kragh |

(Continued)

OTHER PUBLICATIONS

Guo et al. ("Anonymous Credential-Based Privacy-Preserving Identity Verification for Business Processes", 2014 Eighth International Conference on Innovative Mobile and Internet Services in Ubiquitous Computing, IEEE, Jun. 17, 2014, pp. 554-559) (Year: 2014).*
(Continued)

*Primary Examiner* — James D Nigh
(74) *Attorney, Agent, or Firm* — Perkins Coie LLP (57) ABSTRACT

A workflow management system can be used to determine whether a set of transaction events have been properly processed according to a business process rule. A business process rule includes a set of transaction events setup in accordance with a government regulation or an internal company process. An event data may include information associated with a transaction event. A workflow management system includes a workflow management server that receives cryptographically signed transaction event data from one or more additional servers so that the workflow management server can determine whether the received transaction event data comprises a complete or an incomplete transaction.

20 Claims, 6 Drawing Sheets

Related U.S. Application Data continuation of application No. 16/802,415, filed on Feb. 26, 2020, now Pat. No. 11,475,443.

(60) Provisional application No. 62/811,401, filed on Feb. 27, 2019.

(51) Int. Cl.
*H04L 9/30* (2006.01)
*H04L 9/40* (2022.01)

(58) Field of Classification Search
USPC .......................................................... 705/71
See application file for complete search history.

(56) References Cited

U.S. PATENT DOCUMENTS

| | | | |
|---|---|---|---|
| 10,706,141 B2 | 7/2020 | Costa Faidella et al. | |
| 11,270,303 B2 * | 3/2022 | Mandal | G06Q 30/0207 |
| 11,475,443 B1 | 10/2022 | Neuse et al. | |
| 2009/0307032 A1 * | 12/2009 | Tribe | G06Q 10/087 |
| | | | 705/28 |
| 2015/0143125 A1 | 5/2015 | Nix | |
| 2017/0046651 A1 | 2/2017 | Lin et al. | |
| 2017/0286717 A1 | 10/2017 | Khi et al. | |
| 2018/0005186 A1 * | 1/2018 | Hunn | G06F 16/219 |
| 2018/0359264 A1 * | 12/2018 | Sweet | H04L 63/1408 |
| 2019/0121958 A1 | 4/2019 | Costa Faidella et al. | |
| 2020/0014691 A1 * | 1/2020 | Ortiz | H04L 63/0807 |
| 2020/0211099 A1 | 7/2020 | Smith et al. | |

OTHER PUBLICATIONS

U.S. Appl. No. 17/941,944, filed Sep. 9, 2022, Auditable System for Event Tracking.
U.S. Appl. No. 16/802,415 U.S. Pat. No. 11,475,443, filed Feb. 26, 2020 Oct. 18, 2022, Auditable System for Event Tracking.
U.S. Appl. No. 62/811,401, filed Feb. 27, 2019, Auditable System for Event Tracking.

* cited by examiner

AUDITABLE SYSTEM FOR EVENT TRACKING

CROSS-REFERENCE TO RELATED APPLICATIONS

This application is a continuation of U.S. patent application Ser. No. 17/941,944 filed Sep. 9, 2022, now allowed, which is a continuation of U.S. patent application Ser. No. 16/802,415 filed on Feb. 26, 2020, issued as U.S. Pat. No. 11,475,443 on Oct. 18, 2022 and entitled "AUDITABLE SYSTEM FOR EVENT TRACKING," which is a non-provisional of and claims priority to U.S. Provisional Application No. 62/811,401 filed Feb. 27, 2019 and entitled "AUDITABLE SYSTEM FOR EVENT TRACKING," all of which are both hereby incorporated by reference in their entireties for all purposes.

TECHNICAL FIELD

This disclosure is directed generally to methods and apparatuses for providing cryptographically signed information to determine an authenticity of data as well as transaction completions.

BACKGROUND

Companies in the financial sector are required to have proper business processes so that government financial regulators can determine whether financial companies operate their business processes in a manner consistent with government regulations. To demonstrate compliance with government regulations, financial companies show government regulators information about their workflow management system. For example, if a government regulation requires a business process, such as opening a new credit card, to involve multiple events, such verifying identity, checking credit score, determining credit limit, then a financial company may be required to show that its workflow management system is equipped to perform each event prior to approving a new credit card. In some cases, the government regulators may require the financial company to show the information gathered by their workflow management system to prove that the financial company complies with the government regulators.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims. For example, although the disclosure uses financial processes as examples, the technology disclosed within is equally applicable to other sectors.

DETAILED DESCRIPTION

This patent document describes an example of a workflow management system that can be used to determine whether a set of transaction events have been properly processed according to a business process rule. The business process rule includes a set of transaction events that may be setup in accordance with a government regulation or an internal company process. For example, a business process rule to open a new credit card may be setup in accordance with a government regulation to require performance of the following three events: (1) verifying identity, (2) checking credit score, and (3) determining credit limit. An event data may include information associated with a transaction event. For example, identity verification event data may include the name of an applicant requesting the new credit card and a third-party organization that verified the identity of the applicant. The event data may be stored in records.

The workflow management system includes a server that receives digitally signed transaction event data from one or more additional servers (also known as one or more processing systems) so that the workflow management server can determine whether the received transaction event data comprises a complete or an incomplete transaction. Continuing with the example from above, a workflow management server can receive from one or more additional servers digitally signed transaction event data associated with verifying identity, checking credit score, and determining credit limit. In some embodiments, when an event is completed (e.g., when an additional server determines that an identity has been verified), the additional server can digitally sign the verifying identity event data using a private cryptographic key. The one or more additional servers digitally sign the event data to certify as to the authenticity of the event data and/or completion of the event. Using this information, a financial company can certify to a government regulator that the company complies with government regulations for a transaction event. In some embodiments, each cryptographically signed event can be recorded on one or more distributed ledgers accessible by select or all third parties such as the government.

In some embodiments, the processing systems can send the event data to a distributed streaming platform such as Kafka® and the distributed streaming platform can store streams of records in categories (i.e., topics). The distributed streaming platform is generally run on a third party server by a third party service provider but in some embodiments, the distributed streaming platform can be operated and run by the same entity operating the workflow management server. The event data can be stored in these records and sent to the workflow management system. Financial service providers need to prove that the data received into the workflow management system is the same as the data received by the distributed streaming platform. That is, in some cases, events from the distributed streaming platform are not recorded with the workflow management system or recorded twice. By comparing events received into the distributed streaming platform with what is recorded in the workflow management system, an organization can prove to auditors that their data is reliable.

In Section I, this patent document describes techniques for determining whether a set of one or more event data from a single processing system is compliant with a business process rule. In Section II, this patent document describes techniques for determining whether multiple sets of one or more event data from a plurality of processing systems are compliant with a business process rule. The example headings for the various sections below are used to facilitate the understanding of the disclosed subject matter and do not limit the scope of the claimed subject matter in any way. Accordingly, one or more features of one example section can be combined with one or more features of another example section.

I. Processing a Set of Event Data from a Single Processing System

Figure 1:
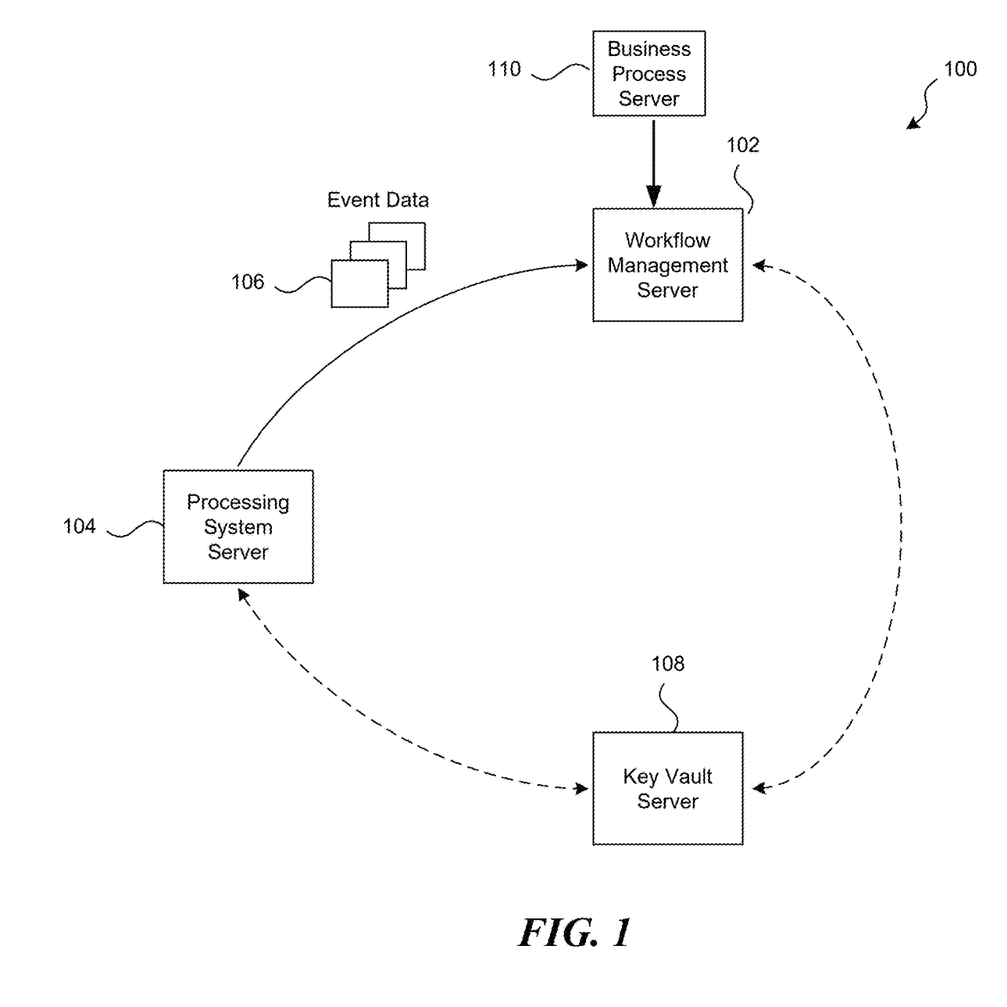
FIG. 1 describes an example of a workflow management system for a single processing system.

FIG. 1 describes an exemplary workflow management system 100 for a single processing system. The workflow management system 100 includes a workflow management server 102 that can determine whether a set of one or more transaction event data 106 received from a processing system server 104 represents a complete or an incomplete transaction according to a business process rule and/or whether the workflow management server 102 recorded all the event data 106. The processing system server 104 may digitally sign the one or more transaction event data 106 using a private cryptographic key obtained from the key vault server 108. The workflow management server 102, the processing system server 104, and the key vault server 108 can communicate with each other via a network, such as the Internet or Intranet.

The processing system server 104 can perform operation(s) related to one or more transaction events. In embodiments related to a single processing system, as shown in FIG. 1, a business process rule may include a set of one or more transaction events that can be performed by a single processing system server 104. For example, a business process rule related to a customer complaint processing system may require that a complaint be entered into the customer complaint processing system server. In this example, a single transaction event is associated with the complaint being entered into the customer complaint processing system server. In another example, a business process rule related to a customer complaint processing system may require performance of two transaction events: entering a complaint into the customer complaint processing system and having a manager take additional action response to the complaint.

The workflow management server is configured to receive a set of one or more transaction event data 106 from the processing system server 104. The set of one or more transaction event data 106 includes data associated with a transaction initiated by or for a user. A transaction initiated by or for a user may include initiating a request to open or close a credit card, debit card, bank account, or loan. The described system is applicable to any type of process that includes multiple steps executed by multiple systems. The multiple steps and systems can take place with one entity or can involve multiple different entities. Additional examples of multiple step processes with multiple systems include issuing a loan such as a mortgage or qualifying a customer for a life insurance policy.

Continuing with the single transaction event example described above, a single transaction event data may include a name of a customer and a time when the customer's complaint was entered into the customer complaint processing system server. And, continuing with the multiple transaction event example described above, first transaction event data may include a name of a customer and a time when the customer's complaint was entered into the customer complaint processing system server, and second transaction event data may include a name of the manager who responded to the complaint and the status of the resolution of the customer complaint.

The processing system server 104 can cryptographically sign the set of one or more event data using a private cryptographic key. A benefit of having the processing system server 104 digitally sign the one or more event data is that it can allow a company to certify the authenticity of the one or more event data sent to the workflow management server 102 for purposes of an audit performed by a government regulator or an external auditor. The private cryptographic key may be assigned to or associated with the processing system server 104 by the key vault server 108. The key vault server 108 sends the public cryptographic key corresponding to the private cryptographic key to the workflow management server 102. In some embodiments, the key vault server is associated with a government entity (i.e., the government entity controls the key pairs). In some embodiments, the key vault server 108 may change the public and private cryptographic keys after a pre-determined time period. As mentioned above, the signed event data can be recorded on a distributed ledger for additional auditing if needed.

In some embodiments, transaction event data may be digitally signed by a user of the processing system server 104 by performing an action (e.g., entering a complaint in a customer complaint processing system server) as opposed to the processing system server 104 as described above. In such embodiments, one or more users may be assigned or associated with one or more private cryptographic keys generated by the key vault server 108. A benefit having an event data digitally signed using a user's private cryptographic key is that the workflow management system 100 can easily identify the user who processed the transaction event data. In some implementations, one entity such as a governmental agency can issue the key pairs and act as a vault by distributing the key pairs to financial institutions. In other embodiments, financial institutions can issue the key pairs but under such circumstances, the key pairs would likely be certified by a third party.

In some embodiments, additional security can be implemented. For example, the key pairs can be rotated. In some implementations, in the event of a compromise of one or more of the private keys, all of the key pairs can be revoked and reissued using a different seed value (i.e., initialization vector/algorithm) to prevent fraudulent authorization of transactions. In some implementations, transactions can be further validated by using system timestamps and a hashed value of system attributes that are more complex to fully replicate. Examples of system attributes that can be hashed include screen resolution, operating system version, language packs/fonts, normalized screen flicker/refresh rate, IP address (assuming long-lease DHCP), user-agent string, MAC address, among others. Ideally, such system attributes are relatively stable and at least have a comparable list of input parameters if/when the hash value changes for audit purposes (e.g., operating system upgrade, new IP addresses assigned).

In some embodiments, the one or more transaction event data may be sent by the processing system server 104 to the workflow management server 102 via a streaming platform server (not shown in FIG. 1). The streaming platform server may store the one or more transaction event data in a digital record that may include a timestamp when the one or more transaction event data were received by the streaming platform server. In such embodiments, the streaming platform servers sends to the workflow management server 102 the digital record that includes the one or more transaction event data and additional information associated with the digital record. By processing the information received from the processing system server, the streaming platform server can enable the workflow management server 102 to perform some beneficial operations such as real-time analytics. A streaming platform server can also decouple different parts of an ecosystem. For example, if one portion of the system is not operational, other portions can still be operational. Another benefit of the streaming platform server is that it creates a persistent log that an activity or step in the process has occurred, guaranteeing a right to proceed with downstream processing.

After the workflow management server 102 receives the set of one or more transaction event data, the workflow management server 102 uses a public cryptographic key associated with the processing system server 104 to determine that the set of one or more event data is validated. The set of transaction event data is considered validated when the workflow management server 102 determines that it successfully decrypted the one or more transaction event data using the public cryptographic key. In embodiments where more than one transaction event data are received, the workflow management server 102 may use an identifier included in each transaction event data to determine that one transaction event data in one set is related to another transaction event data in the same set.

Once the set of one or more transaction event data is validated and after an appropriate period of time required for processing (e.g., after a complaint is initially documented, there may be a delay in actually responding or completing a follow-up action), the workflow management server 102 determines that the set of one or more event data comprise a complete or an incomplete transaction. As described in this patent document, a set of one or more event data can represent the steps or operations performed for a transaction. In some implementations, a business process server 110 can map or define all sets of steps or operations that can be performed for a particular transaction and the order in which the steps or operations should occur. By mapping all the possibilities for each transaction based on the event data in the business process server 110, the workflow management server 102 can detect issues with any of the processes. The workflow management server 102 compares the validated set of one or more event data to the pre-determined business process rule that describes a number of transaction events required for a transaction to determine whether the set of one or more transaction event data comprises a complete or an incomplete transaction. By determining whether a set of transaction event data comprises a complete or an incomplete transaction, a company can provide such information to external auditors or government regulators to demonstrate that its business processes can be determined to be consistent with a government regulation or an internal company process.

In the multiple transaction event example described above, a business process rule for a customer complaint process may require the presence of two transaction event data: a first transaction event data that includes a name of a customer and a time when the customer's complaint was entered, and a second transaction event data that includes a name of the manager who responded to the complaint and the status of the resolution of the customer complaint. In this example, the workflow management server 102 can determine that the first and second set transaction data satisfy the business process rule defined in business process server 110 by comparing the number of transaction event data received with the number of transaction event data required by the business process rule. Thus, in this example, the workflow management server 102 can determine that the transaction is complete. In a related example, if the workflow management server 104 determines that only one out of the two transaction events have been performed, then the workflow management server 204 can determine that the received set of transaction event data comprises an incomplete transaction.

II. Processing Multiple Sets of Event Data from Multiple Processing Systems

Figure 2:
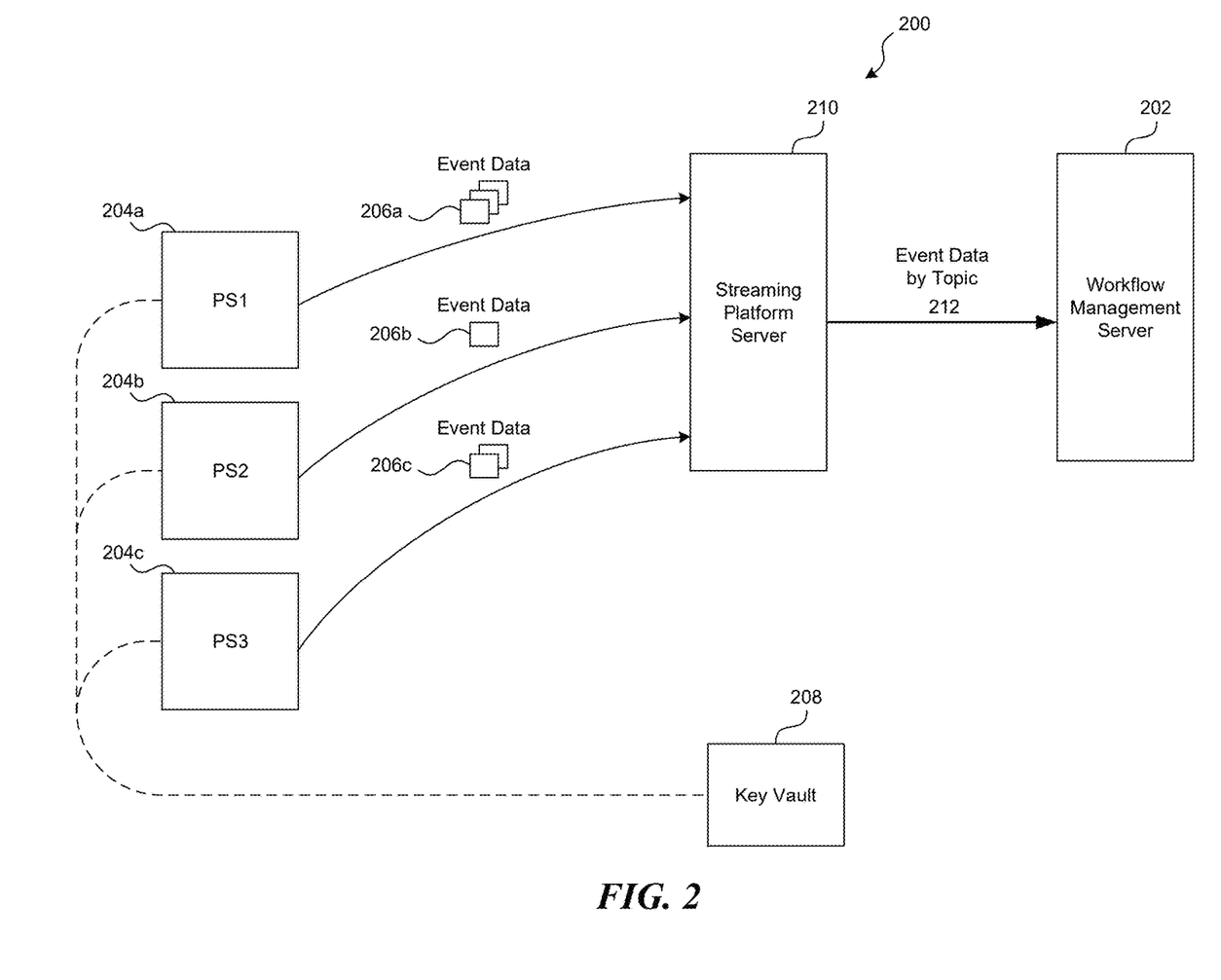
FIG. 2 describes an example of a workflow management system for multiple processing systems.

FIG. 2 describes an example of a workflow management system 200 for multiple processing systems (e.g., PS1, PS2, PS3). The workflow management system 200 includes a workflow management server 202, which can perform some or all of the operations described for the workflow management server 102 in FIG. 1. The workflow management server 202 can determine whether multiple sets of one or more transaction event data 206*a*, 206*b*, 206*c* received from multiple processing system servers 204*a*, 204*b*, 204*c* represents a complete or an incomplete transaction according to a business process rule. Each of the processing system servers 204*a*, 204*b*, 204*c* may digitally sign their respective one or more transaction event data using their respective private cryptographic keys obtained from the key vault server 208. The workflow management server 202, the processing system servers 204*a*, 204*b*, 204*c*, and the key vault server 208 can communicate with each other via a network, such as the Internet or Intranet.

Each of the processing system servers 204*a*, 204*b*, 204*c* can perform operation(s) related to one or more transaction events and send such data to a distributed streaming platform such as streaming platform server 210. Streaming platform server 210 can process the transaction event data and organize them into topics (e.g., digital records). Streaming platform server 210 can send the organized transaction event data (e.g., digital records) to the workflow management server 202. Typically, the topics are static. For example, a topic can be "credit check" and the events within the topic can be "approved," "denied" or "unable to access." The topics can serve as addresses so the processing system servers 204*a*, 204*b*, 204*c* knows where to send the event, and similarly, the streaming platform server 210 knows where to send the event.

In embodiments related to multiple processing systems, as shown in FIG. 2, a business process rule may include multiple sets of one or more transaction events, where each set of transaction events can be performed by each processing system server 204*a*, 204*b*, 204*c*. For example, a business process rule related to issuing a new credit card may include a first set of three transaction events 206*a* performed by a first processing system server 204*a*, a second set of a single transaction event 206*b* performed by a second processing system server 204*b*, and a third set of two transaction events 206*c* performed by a third processing system server 204*c*. In this example, a first processing system server 204*a* may be a credit card origination server that may perform the following three example transaction events related to a person requesting a new credit card: (1) obtaining identity information, (2) obtaining bank information, and (3) obtaining salary information. The second processing system server 204b may be a credit agency server that may provide, as a single transaction event, credit information about the person requesting the new credit card. The third processing system server 204c may be a document generation server that may perform the following two example transaction events: (1) print a document that includes information associated with the new credit card issued to the person, and (2) print and send the new credit card to the person. The processing system servers 204a, 204b, 204c gather data associated with each transaction event.

Each processing system servers 204a, 204b, 204c cryptographically signs the corresponding set of one or more transaction event data. Each transaction event data is cryptographically signed using a private cryptographic key assigned to or associated with the processing system server signing the transaction event data. The key vault server 208 assigns the private cryptographic key to the processing system servers 204a, 204b, 204c. The key vault server 208 also sends the public cryptographic keys corresponding to the private cryptographic keys to the workflow management server 202.

The processing system servers 204a, 204b, 204c send the cryptographically signed transaction event data to streaming platform server 210. After processing the event data into an output consumable by the workflow management server 202, streaming platform server 210 sends the event data by topic (or in another format) 212 to the workflow management server 202. The streaming platform server 210 may process the multiple sets of one or more event data into multiple related topics. For example, the streaming platform server 210 can organize the three transaction event data 206a from processing system server 204a into a single topic or digital record. In other words, a topic or digital record sent by the streaming platform server 210 to the workflow management server 202 includes the one or more event data sent by a processing system server. By organizing the multiple sets of one or more event data into multiple topics that are sent to the workflow management server 202, the streaming platform server 210 enables the workflow management server 202 to more efficiently perform real-time analytics on the multiple records. The distributed streaming platform can serve as a transport mechanism to receive information, organize and send it to its destination in real-time or near real-time.

Upon receiving the event data from the streaming platform, the workflow management server 202 uses the public cryptographic keys associated with the processing system servers 204a, 204b, 204c to determine that the data recorded into the system by the workflow management server 202 matches the multiple sets of event data 206a-c received by the streaming platform server 210. The sets of transaction event data are considered validated when the workflow management server 202 determines that it successfully decrypted the multiple sets of one or more transaction event data using the public cryptographic keys and that the data received into the workflow management server 202 and recorded by the system match. In embodiments where more than one transaction event data are received for one set, the workflow management server 102 may use an identifier included in each transaction event data to determine that one transaction event data in one set is related to another transaction event data in the same set. Furthermore, in embodiments involving more than one set of transaction event data (206a and 206c in the example shown in FIG. 2), the workflow management server 202 may use an identifier included in the multiple transaction event data to determine that one transaction event data in one set is related to another transaction event data of another set. Such identifier must be globally unique across all instances of all of the businesses.

Once the sets of one or more transaction event data are validated, the workflow management server 202 determines that the sets of one or more event data comprise a complete or an incomplete transaction. The workflow management server 202 compares the validated set of one or more event data to a pre-determined business process rule that describe a number of transaction events required for a transaction to determine whether the set of one or more transaction event data comprises a complete or an incomplete transaction. Continuing with the example described above, a business process rule for opening a new credit card may require the performance of the following transaction events associated with a person to be considered a complete transaction: (1) obtaining identity information, (2) obtaining bank information, (3) obtaining salary information, (4) obtaining credit information, (5) printing a document that includes information associated with the new credit card issued to the person, and (6) print and send the new credit card to the person. If the processing system servers 204a, 204b, 204c provide transaction event data that indicates to the workflow management server 204 that the above six transaction events have been performed, then the workflow management server 204 can determine that the received sets of transaction event data comprise a complete transaction. In a related example, if the workflow management server 204 determines that only five out of six transaction events have been performed, then the workflow management server 204 can determine that the received sets of transaction event data comprise an incomplete transaction.

In some embodiments, the streaming platform server 210 may send a digital record for one or more event data that may not be recorded or stored by the workflow management server 202, for example, due to some server or system related glitch. One of the benefits of having the workflow management server 102 compare the received event data to a business process rule is that the workflow management server 102 can determine whether it has properly recorded all the event data.

For the technology described in Sections I and II, the business process rule can be flexibly designed to allow the workflow management server to determine whether a transaction is complete or incomplete. For example, if a business process rule indicates that a performance of a number of transaction events less than a total number of transaction events (e.g., performance of five out of six transaction events) comprises a complete transaction, then the workflow management server receiving only five out of six transaction events may determine that a transaction is complete. For example, if a user does not have the proper credit, transaction event number 6 will not occur (and is not supposed to occur). Thus, workflow management server 202 can determine a number of events relevant to the specific transaction.

Figure 3:
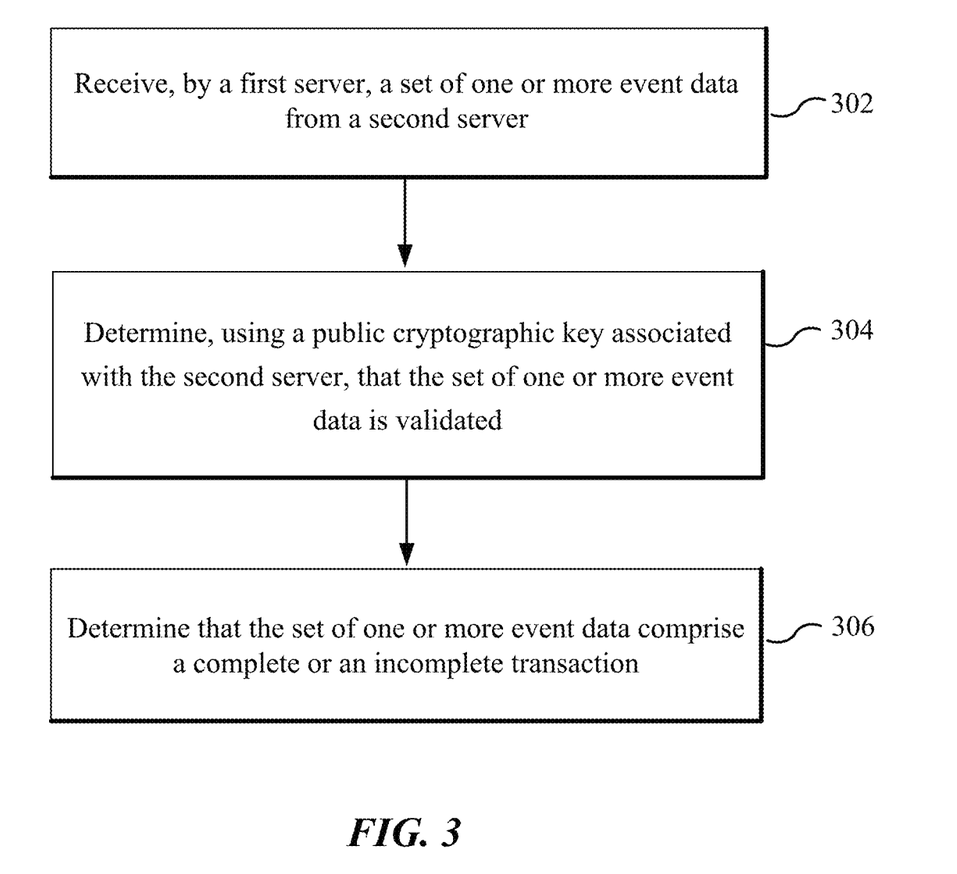
FIG. 3 shows an example flow diagram of a server for auditing a transaction.

FIG. 3 shows an example flow diagram of a server for auditing a transaction. At the receiving operation 302, a first server receives a set of one or more event data from a second server. The set of one or more event data includes data associated with a transaction initiated by or for a user. In some embodiments, the transaction includes initiating a request to open or close a credit card, debit card, bank account, or loan. The set of one or more event data is cryptographically signed by the second server using a private cryptographic key assigned to or associated with the second server.

At the determining operation 304, the first server determines, using a public cryptographic key associated with the second server, that the set of one or more event data is validated. At the determining operation 306, the first server determines that the set of one or more event data comprise a complete or an incomplete transaction by comparing the validated set of one or more event data to a pre-determined business process rule that describe a number of transaction events required for the transaction.

In some embodiments involving multiple sets of one or more transaction events, the first server is configured to receive a first set of one or more event data from a second server and a second set of one or more event data from a third server. The first and second sets of event data includes data associated with a transaction initiated by or for a user, and the first and second sets of event data are cryptographically signed by the second and third servers, respectively, using the private cryptographic keys assigned to the second and third servers. Next, the first server determines, using the public cryptographic keys associated with the second and third servers, that the first and second sets of event data are validated. Finally, the first server determines that the first set of one or more event data and the second set of one or more event data comprise a complete or an incomplete transaction by comparing the validated first set of one or more event data and the validated second set of one or more event data to the pre-determined business process rule associated that describe the number of transaction events required for transaction. In embodiments involving multiple sets of one or more transaction events, the first server determines that the first set of one or more event data is associated with the second set of one or more event data based on an identifier included in each event data.

In some embodiments, the public cryptographic key and the private cryptographic key are assigned or generated by an additional server associated with a government entity. In some embodiments, the public cryptographic key and the private cryptographic key is changed by a key vault server after a pre-determined time period.

Figure 4:
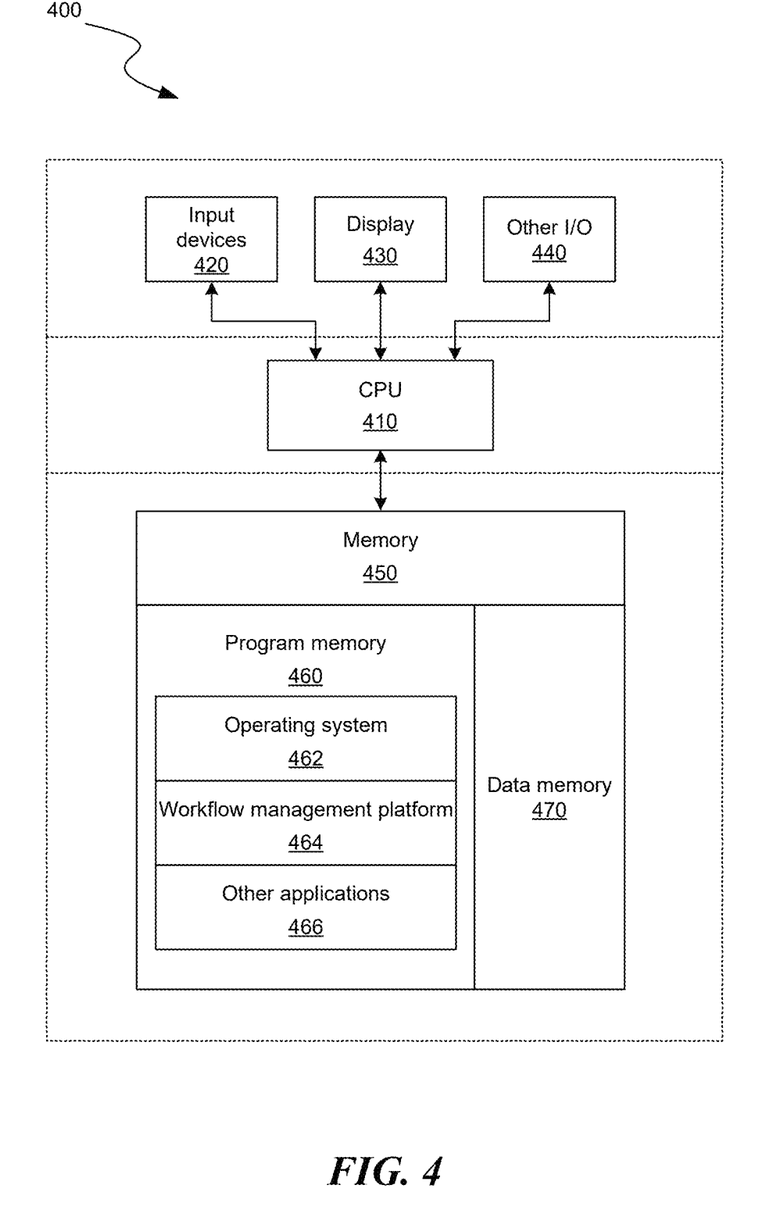
FIG. 4 is a block diagram illustrating an overview of devices on which some implementations of the disclosed technology can operate.

FIG. 4 is a block diagram illustrating an overview of devices on which some implementations of the disclosed technology can operate. The devices can comprise hardware components of a device 400 that manages the workflow management platform 464 that may include information associated with and/or perform operations on set(s) of one or more transaction event data. Device 400 can include one or more input devices 420 that provide input to the CPU (processor) 410, notifying it of actions. The actions are typically mediated by a hardware controller that interprets the signals received from the input device and communicates the information to the CPU 410 using a communication protocol. Input devices 420 include, for example, a mouse, a keyboard, a touchscreen, an infrared sensor, a touchpad, a wearable input device, a camera- or image-based input device, a microphone, or other user input devices.

CPU 410 can be a single processing unit or multiple processing units in a device or distributed across multiple devices. CPU 410 can be coupled to other hardware devices, for example, with the use of a bus, such as a PCI bus or SCSI bus. The CPU 410 can communicate with a hardware controller for devices, such as for a display 430. Display 430 can be used to display text and graphics. In some examples, display 430 provides graphical and textual visual feedback to a user. In some implementations, display 430 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 440 can also be coupled to the processor, such as a network card, video card, audio card, USB, FireWire or other external device, camera, printer, speakers, CD-ROM drive, DVD drive, disk drive, or Blu-Ray device.

In some implementations, the device 400 also includes a communication device capable of communicating wirelessly or wire-based with a network node. The communication device can communicate with another device or a server through a network using, for example, TCP/IP protocols. Device 400 can utilize the communication device to distribute operations across multiple network devices.

The CPU 410 can have access to a memory 450. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 450 can include program memory 460 that stores programs and software, such as an operating system 462, workflow management platform 464, and other application programs 466. Memory 450 can also include data memory 470 that can include one or more business process rules, one or more public cryptographic keys for one or more processing system servers, set(s) of one or more transaction event data, etc., which can be provided to the program memory 460 or any element of the device 400.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, portable electronic devices such as smartphones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 5:
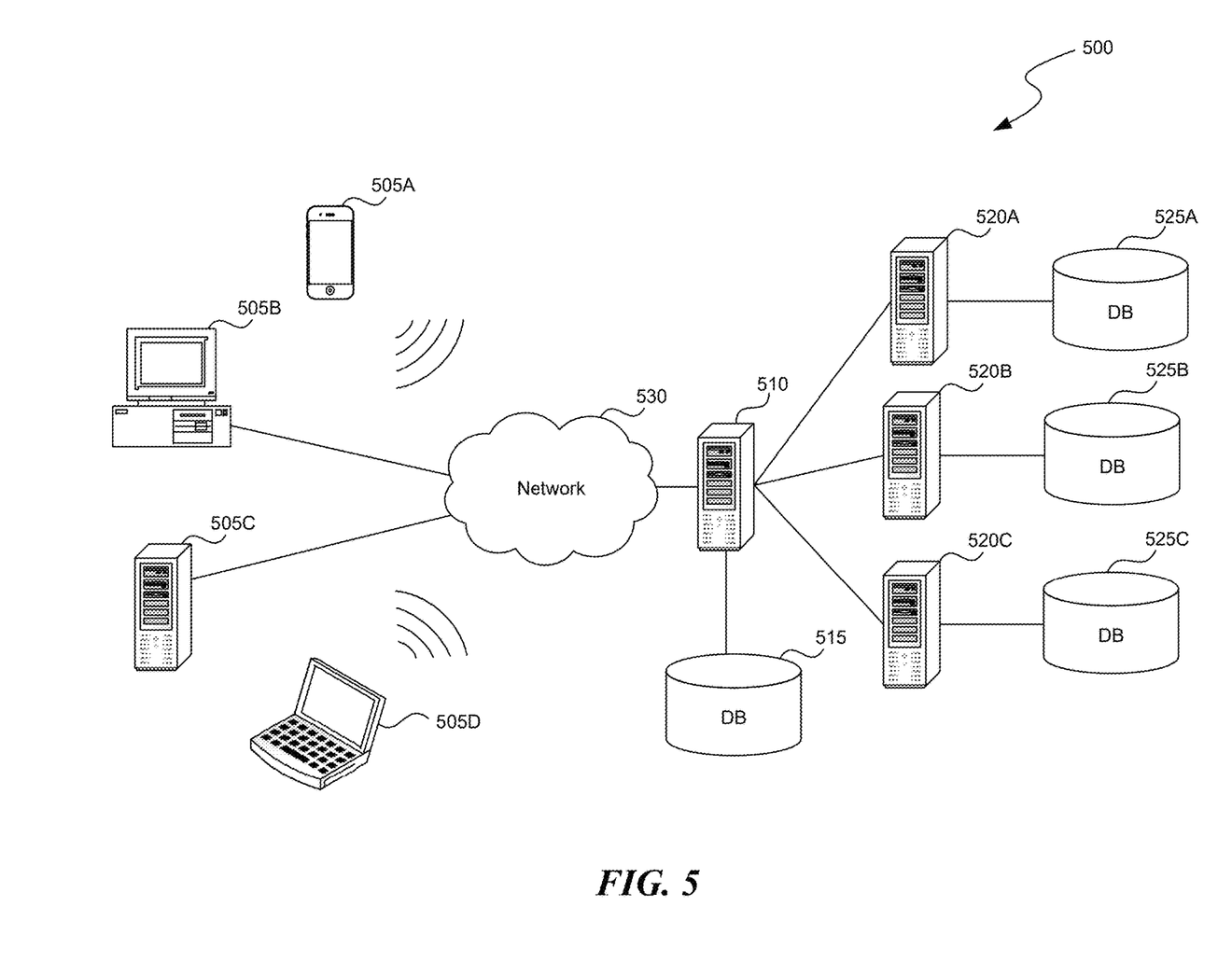
FIG. 5 is a block diagram illustrating an overview of an environment in which some implementations of the disclosed technology can operate.

FIG. 5 is a block diagram illustrating an overview of an environment 500 in which some implementations of the disclosed technology can operate. Environment 500 can include one or more client computing devices 505A-D, examples of which can include device 400. Client computing devices 505A-D can operate in a networked environment using logical connections through network 530 to one or more remote computers, such as a server computing device 510. As shown in FIG. 5, examples of client computing devices 505A-D may include a portable electronic device 505A, a computer 505B, a server 505C, or a laptop 505D.

In some implementations, server computing device 510 can be an edge server that receives client requests and coordinates fulfillment of those requests through other servers, such as servers 520A-C. Server computing devices 510 and 520A-C can comprise computing systems, such as device 400. Though each server computing device 510 and 520A-C is displayed logically as a single server, server computing devices can each be a distributed computing environment encompassing multiple computing devices located at the same or at geographically disparate physical locations. In some implementations, each server computing device 520 corresponds to a group of servers.

Client computing devices 505A-D and server computing devices 510 and 520A-C can each act as a server or client to other server/client devices. Server 510 can connect to a database 515. Servers 520A-C can each connect to a corresponding database 525A-C. As discussed above, each server 520 can correspond to a group of servers, and each of these servers can share a database or can have their own database. Databases 515 and 525 can warehouse (e.g., store) information such as one or more business process rules, one or more public cryptographic keys for one or more processing system servers, set(s) of one or more transaction event data. Though databases 515 and 525 are displayed logically as single units, databases 515 and 525 can each be a distributed computing environment encompassing multiple computing devices, can be located within their corresponding server, or can be located at the same or at geographically disparate physical locations.

Network 530 can be a local area network (LAN) or a wide area network (WAN), but can also be other wired or wireless networks. Network 530 may be the Internet or some other public or private network. Client computing devices 505 can be connected to network 530 through a network interface, such as by wired or wireless communication. While the connections between server 510 and servers 520A-C are shown as separate connections, these connections can be any kind of local, wide area, wired, or wireless network, including network 530 or a separate public or private network.

Figure 6:
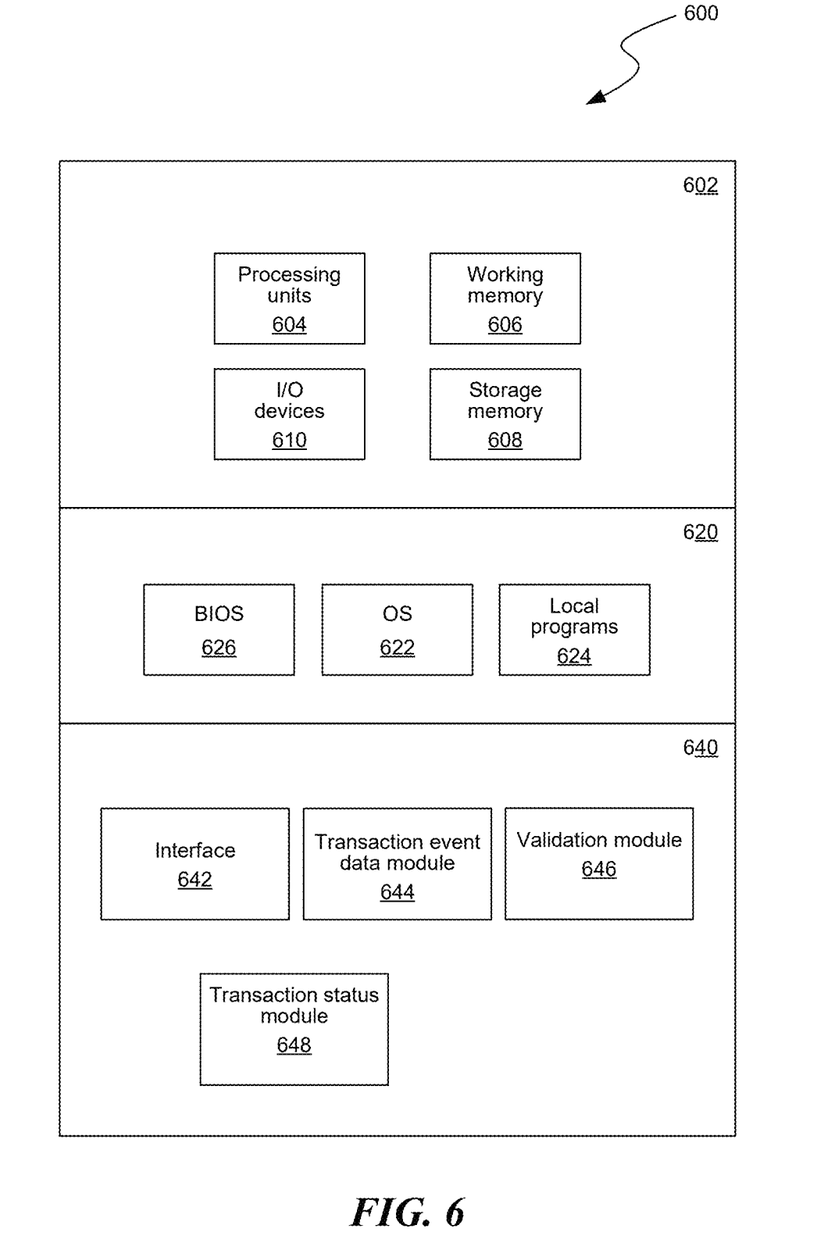
FIG. 6 is a block diagram illustrating components which, in some implementations, can be used in a system employing the disclosed technology.

FIG. 6 is a block diagram illustrating components 600 which, in some implementations, can be used in a system employing the disclosed technology. The components 600 include hardware 602, general software 620, and specialized components 640. As discussed above, a system implementing the disclosed technology can use various hardware, including processing units 604 (e.g., CPUs, GPUs, APUs, etc.), working memory 606, storage memory 608, and input and output devices 610. Some or all of the components 600 can be implemented in a client computing device such as client computing devices 505A-D or on a server computing device, such as server computing device 510 or 520A-C. For example, the operations and/or features of the workflow management server can be implemented in a server computing device 510 or 520A-C.

General software 620 can include various applications, including an operating system 622, local programs 624, and a basic input output system (BIOS) 626. Specialized components 640 can be subcomponents of a general software application 620, such as local programs 624. Specialized components 640 can include any one or more of transaction event data module 644 that can receive set(s) of one or more event data from another server, a validation module 646 that can determine using one or more public cryptographic keys that the set(s) of one or more event data are validated, and a transaction status module 648 that can determine whether the validated set(s) of one or more event data represents a complete or an incomplete transaction based on a business process rule, and components that can be used for transferring data and controlling the specialized components, such as interface 642. The operations associated with the transaction event data module 644, validation module 646, and transaction status module 648 are further described in FIG. 3 in operations 302, 304, and 306, respectively, and in other parts of this patent document. In some implementations, components 600 can be in a computing system that is distributed across multiple computing devices or can be an interface to a server-based application executing one or more of specialized components 640.

Those skilled in the art will appreciate that the components illustrated in FIGS. 3-6 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for", but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

We claim:

1. A method comprising:
   receiving, by a first server, at least one pre-determined business process rule from a second server;
   receiving, by the first server, a set of one or more event data from a third server,
      wherein the set of one or more event data is cryptographically signed by the third server using a private cryptographic key associated with the third server;
   determining, using a public cryptographic key associated with the third server, that the set of one or more event data is validated;
   determining a number of transaction events required for a transaction based on the at least one pre-determined business process rule; and
   determining that the set of one or more event data comprise a complete transaction or an incomplete transaction by comparing the set of one or more event data to the number of transaction events required for the transaction.

2. The method of claim 1, further comprising:
   receiving, by the first server, the set of one or more event data from the second server via a fourth server,
      wherein the fourth server organizes the set of one or more event data in a digital record, wherein the digital record is sent to the first server.

3. The method of claim 1, further comprising:
   determining the set of one or more event data is related to a second set of one or more event data based on an identifier, wherein the identifier is included in the set of one or more event data and the second set of one or more event data.

4. The method of claim 1, further comprising:
   receiving, from a key vault server, the public cryptographic key corresponding to the private cryptographic key.

5. The method of claim 1, wherein the public cryptographic key and the private cryptographic key are assigned or generated by a key vault server, wherein the key vault server is associated with a transaction regulation entity.

6. The method of claim 1, wherein the public cryptographic key and the private cryptographic key is changed after a pre-determined time period.

7. The method of claim 1, wherein the transaction includes initiating a request to open or close a credit card, a debit card, a bank account, or a loan.

8. A system comprising:
   one or more processors; and
   one or more memories storing instructions that, when executed by the one or more processors, cause the system to perform a process comprising:
      receiving, by a first server, at least one pre-determined business process rule from a second server;
      receiving, by the first server, a set of one or more event data from a third server,
         wherein the set of one or more event data is cryptographically signed by the third server using a private cryptographic key associated with the third server;
      determining, using a public cryptographic key associated with the third server, that the set of one or more event data is validated;
      determining a number of transaction events required for a transaction based on the at least one pre-determined business process rule; and determining that the set of one or more event data comprise a complete transaction or an incomplete transaction by comparing the set of one or more event data to the number of transaction events required for the transaction.

9. The system of claim 8, wherein the process further comprises:
receiving, by the first server, the set of one or more event data from the second server via a fourth server,
wherein the fourth server organizes the set of one or more event data in a digital record, wherein the digital record is sent to the first server.

10. The system of claim 8, wherein the process further comprises:
determining the set of one or more event data is related to a second set of one or more event data based on an identifier, wherein the identifier is included in the set of one or more event data and the second set of one or more event data.

11. The system of claim 8, wherein the process further comprises:
receiving, from a key vault server, the public cryptographic key corresponding to the private cryptographic key.

12. The system of claim 8, wherein the public cryptographic key and the private cryptographic key are assigned or generated by a key vault server, wherein the key vault server is associated with a transaction regulation entity.

13. The system of claim 8, wherein the public cryptographic key and the private cryptographic key is changed after a pre-determined time period.

14. The system of claim 8, wherein the transaction includes initiating a request to open or close a credit card, a debit card, a bank account, or a loan.

15. A non-transitory computer-readable medium storing instructions that, when executed by a computing system, cause the computing system to perform operations comprising:
receiving, by a first server, at least one pre-determined business process rule from a second server;
receiving, by the first server, a set of one or more event data from a third server,
wherein the set of one or more event data is cryptographically signed by the third server using a private cryptographic key associated with the third server;
determining, using a public cryptographic key associated with the third server, that the set of one or more event data is validated;
determining a number of transaction events required for a transaction based on the at least one pre-determined business process rule; and
determining that the set of one or more event data comprise a complete transaction or an incomplete transaction by comparing the set of one or more event data to the number of transaction events required for the transaction.

16. The non-transitory computer-readable medium of claim 15, wherein the operations further comprise:
receiving, by the first server, the set of one or more event data from the second server via a fourth server,
wherein the fourth server organizes the set of one or more event data in a digital record, wherein the digital record is sent to the first server.

17. The non-transitory computer-readable medium of claim 15, wherein the operations further comprise:
determining the set of one or more event data is related to a second set of one or more event data based on an identifier, wherein the identifier is included in the set of one or more event data and the second set of one or more event data.

18. The non-transitory computer-readable medium of claim 15, wherein the operations further comprise:
receiving, from a key vault server, the public cryptographic key corresponding to the private cryptographic key.

19. The non-transitory computer-readable medium of claim 15, wherein the public cryptographic key and the private cryptographic key are assigned or generated by a key vault server, wherein the key vault server is associated with a transaction regulation entity.

20. The non-transitory computer-readable medium of claim 15,
wherein the public cryptographic key and the private cryptographic key is changed after a pre-determined time period, and
wherein the transaction includes initiating a request to open or close a credit card, a debit card, a bank account, or a loan.

* * * * *